United States Patent
Karoly

(10) Patent No.: US 7,077,368 B1
(45) Date of Patent: Jul. 18, 2006

(54) SPINDLE SUPPORT STAND

(76) Inventor: John Karoly, 2610 24th Ave. North, St. Petersburg, FL (US) 33713

( * ) Notice: Subject to any disclaimer, the term of this patent is extended or adjusted under 35 U.S.C. 154(b) by 0 days.

(21) Appl. No.: 10/880,828

(22) Filed: Jun. 30, 2004

Related U.S. Application Data

(60) Provisional application No. 60/483,985, filed on Jun. 30, 2003, provisional application No. 60/501,294, filed on Sep. 8, 2003.

(51) Int. Cl.
*F16M 11/00* (2006.01)
*B65H 49/32* (2006.01)

(52) U.S. Cl. .................... 248/163.2; 242/598.3; 242/598.5

(58) Field of Classification Search .......... 248/163.2, 248/164, 170, 440.1, 81, 83; 242/129.6, 242/557, 598.3, 599.3, 598.5
See application file for complete search history.

(56) References Cited

U.S. PATENT DOCUMENTS

| | | | |
|---|---|---|---|
| 442,309 A | 12/1890 | Trudeau | |
| 1,479,209 A | 1/1924 | Topp | |
| 1,509,717 A | 9/1924 | Davis | |
| 2,551,190 A * | 5/1951 | Walker | 242/594.5 |
| 3,383,071 A | 5/1968 | Godson | |
| 4,496,028 A | 1/1985 | Peterson | |
| 4,706,906 A * | 11/1987 | Roman et al. | 242/401 |
| 4,752,047 A | 6/1988 | Franks, Jr. | |
| 4,932,601 A | 6/1990 | Arrington | |
| 5,452,872 A * | 9/1995 | Barnes et al. | 248/85 |
| 5,692,701 A | 12/1997 | Holliday | |
| 5,806,787 A * | 9/1998 | Schneider | 242/129.6 |
| 6,076,780 A | 6/2000 | Honnecke et al. | |
| 6,086,013 A * | 7/2000 | Looney et al. | 242/594.4 |
| 6,199,786 B1 * | 3/2001 | Lessard et al. | 242/406 |
| 6,299,100 B1 | 10/2001 | Cloud | |

FOREIGN PATENT DOCUMENTS

| | | |
|---|---|---|
| GB | 827.826 | 2/1960 |
| GB | 966.726 | 8/1964 |

* cited by examiner

*Primary Examiner*—Anita M. King
(74) *Attorney, Agent, or Firm*—Michael I. Kroll

(57) ABSTRACT

A pair of collapsible supports 12, 14 have a collar 18 positioned on the upper end of one support 12 forming an integral part therewith. The device 10 is designed to be used in pairs on the ends of a user supplied rod 26. Each stand 10 is slidably inserted onto the distal ends of the rod 26 by a collar 18 and the legs 12, 14 are then pivotally extended to their open position thereby providing a device for supporting a spool 32 of material rotatively mounted on the rod.

10 Claims, 9 Drawing Sheets

US 7,077,368 B1

SPINDLE SUPPORT STAND

RELATED APPLICATIONS

This application is subject to U.S. provisional application Ser. No. 60/483,985, filed 30 Jun. 2003 and U.S. provisional application Ser. No. 60/501,294, filed 8 Sep. 2003. Please incorporate by reference all information in said provisional applications into this instant application.

BACKGROUND OF THE INVENTION

1. Field of the Invention

The present invention relates generally to support stands and, more specifically, to a collapsible support stand having a collar positioned on the upper end and forming an integral part therewith. The device is designed to be used in pairs with a user supplied rod. Each stand is slidably inserted onto the distal ends of the rod by means of their respective collar and the legs are pivotally extended to their open position thereby providing means for support spooled material rotatively mounted on the rod.

The present invention has a primary support elements pivotally engaged by means of a fastener to a pivoting support element positioned therebetween having a holding element integral to it's structure and protruding therefrom, with the holding element having a throughbore that creates a receiving aperture for insertion therethrough of a rod or axle. When the spindle or axle is inserted into the receiving aperture the U-shaped support element is swung forward till further movement is obstructed by the rod or axle, this operation articulates the support elements into an "A" frame configuration. When a sufficient number of the present invention are attached to the axle or spindle of the desired spool or reel to be unwound, they are placed with the bottom portion of the support elements contacting a foundation surface. While supporting the held rod or axle the present invention also provides a clamping action produced by the gravitational forces originating from the held rod or axle and spool or reel, these gravitational forces cause the support elements contacting the ground to apply torque about the pivotal connection provided by the fastener, the torsional forces are however obstructed by the held spindle or axle creating a clamping action about the rod or axle between the holding element and pivoting support element. Additionally the support elements may be outfitted with adjustable telescopic elements to adjust for height and length of the support elements to accommodate for larger spools or reels to provide sufficient ground clearance.

2. Description of the Prior Art

There are other support devices designed for spools or reels. Typical of these is U.S. Pat. No. 442,309 issued to Diamond et al. on Dec. 9, 1890.

Another patent was issued to Topp on Jan. 1, 1924 as U.S. Pat. No. 1,479,209. Yet another U.S. Pat. No. 1,509,717 was issued to Davis on Sep. 23, 1924 and still yet another was issued on May 14, 1968 to Godson as U.S. Pat. No. 3,383,071.

Another patent was issued to Peterson on Jan. 29, 1985 as U.S. Pat. No. 4,496,028. Yet another U.S. Pat. No. 4,752,047 was issued to Franks, Jr. on Jun. 21, 1988. Another was issued to Arrington on Jun. 12, 1990 as U.S. Pat. No. 4,932,601 and still yet another was issued on Dec. 2, 1997 to Holliday as U.S. Pat. No. 5,692,701.

Another patent was issued to Honnecke, et al. on Jun. 20, 2000 as U.S. Pat. No. 6,076,780. Yet another U.S. Pat. No. 6,299,100 was issued to Cloud on Oct. 9, 2001. Another was issued to Standard Telefon Og Kabel-Fabric on Feb. 10, 1960 as United Kingdom No. GB827,826 and still yet another was issued on Aug. 12, 1964 to Clarke as United Kingdom Patent No. GB966,726.

U.S. Pat. No. 442,309

Inventor: George W. Diamond et al.

Issued: Dec. 9, 1890

In a reel, the combination of a supporting-shaft, supports upon the shaft relatively adjustable along the latter, bars D at intervals about the shaft, toggles r r', connecting the bars D toward opposite ends, respectively, with the respective supports, means, substantially as described, for adjusting the supports with relation to each other to cause the bars D to approach or recede from the shaft, and retaining devices E E' toward opposite ends of the shaft, one of which is removable, substantially as set forth.

U.S. Pat. No. 1,479,209

Inventor: Maurice J. Topp

Issued: Jan. 1, 1924

A collapsible horse comprising a channel bar and pivotal pins extending across the channel and secured to the opposite sides thereof, and separate pairs of legs pivotally hung upon said pins and slidable lengthwise thereof to swing into and out of the channel, the legs of each pair being pivoted to each other to swing transversely of the channel.

U.S. Pat. No. 1,509,717

Inventor: Charles C. Davis

Issued: Sep. 23, 1924

In a device of the character described, the combination with a frame having parallel side bars and one end cross bar, of a supporting bar removably carried by the side bars intermediate their ends and adapted to form a rotatable axis for a reel, and a combined draw bar and handle swingingly connected centrally of said cross bar and adapted when in one position to serve as a prop for said frame when standing upon a foundation and when in another position constituting a draft device, and when in still another position to be substantially parallel with and in folded relation to the said side bars.

U.S. Pat. No. 3,383,071

Inventor: Roy E. Godson

Issued: May 14, 1968

A combination of a wire dispenser and a spool of wire, said combination comprising:

(a) a primary support and a secondary support;

(b) said primary support comprising two spaced apart first members;

(c) each first member comprising a first main arm;

(d) the first main arm on its upper end connecting with a support arm;

(e) said support arm on its upper end connecting with a crossarm;

(f) said crossarm connecting with a positioning arm;

(h) said positioning arm being at substantially a right angle to the crossarm and substantially parallel and spaced apart from the support arm;

(i) said first main arms diverging outwardly from the support arms;

(j) a plurality of cross braces connecting said first main arms;

(k) a plurality of upwardly inclined support lugs on the first main arms;

(l) said support lugs being in pairs with the lugs being aligned and at substantially the same elevation on the first main arms to position a support shaft;

(m) said secondary support comprising two spaced second main arms;

(n) a plurality of cross braces connecting said second main arms;

(o) said second main arms diverging outwardly from the upper part to the lower part;

(p) a plurality of upwardly inclined support lugs on the second main arms;

(q) said support lugs being in pairs with the lugs being aligned and at substantially the same elevation on the second main arms to position a support shaft;

(r) a shaft connecting the upper part of the second main arms and the first members;

(s) a base connector connecting the lower part of the second main arms and the first main arms to keep the lower part of the primary support and the secondary support from spreading too far apart;

(t) a support shaft positioned on two of the aligned support lugs and, (u) a spool of wire on said support shaft.

U.S. Pat. No. 4,496,028

Inventor: Theodore A. Peterson

Issued: Jan. 29, 1985

A sawhorse utilizing no nails or other fasteners comprising an elongate, generally circular member having a comparatively thick sidewall, but being otherwise hollow. The generally circular member is made of resilient material, having a spring-like quality, and the sidewall of the member is longitudinally cut for its entire length in a direction essentially parallel to the centerline of the generally circular member. Also, a pair of leg-receiving holes are cut through the generally circular member at a location substantially opposite from the longitudinal cut, with such holes being circumferentially spaced apart, and each being substantially equidistant from the ends of the circular member. Each of these holes is arranged to receive the upper end of an elongate leg member. Therefore, as the user draws the bottoms of the leg members together, the edges of the longitudinal cut are caused to move apart, so as to be able to receive the central beam of a sawhorse, and thereafter to tightly grasp such beam in a pincers-like grip when the leg members are released. Typically, two of the generally circular members are utilized for each sawhorse, with each member having associated therewith a pair of legs. The generally circular members may be made of PVC, such as of three inch inside diameter, and the longitudinal cut may be beveled in order to increase the power with which the central beam of the sawhorse is gripped by the edges of the cut.

U.S. Pat. No. 4,752,047

Inventor: George J. Franks Jr.

Issued: Jun. 21, 1988

A collapsible cable or wire spool stand which, when erected, provides a stable platform about which a spool of cable or wire material can be supported to permit the withdrawal of cable or wire contained on the spool. The support structure may be readily collapsed from its erected configuration to minimize storage space. In a collapsed configuration, the horizontally disposed axle, upon which the spool is supported functions as a convenient handle to form a convenient handle for carrying the spool support stand.

U.S. Pat. No. 4,932,601

Inventor: J. W. Arrington

Issued: Jun. 12, 1990

A reel lift which includes a pair of cooperating lifting members, each characterized by a base constructed of angle iron and fitted with an upward-standing trunk which is also constructed of angle iron, which trunk divides the base into a foot portion and a heel portion of dissimilar size. A handle is welded or otherwise fixedly attached to the upward-standing trunk and a support sleeve is secured to the trunk in transverse relationship with respect to the handle and the base, in order to facilitate insertion of a support pipe for utilizing the reel lift members in concert to support a reel therebetween.

U.S. Pat. No. 5,692,701

Inventor: Larry R. Holliday

Issued: Dec. 2, 1997

Leg brackets for the reel holder have a bore between the side surfaces of its body portion. The bores are capable of receiving existing conduit which is combined with the leg brackets to form a holder for wire reels. The body portion has upwardly angled leg sockets extending in from each end and capable of receiving legs that support the body portion in a reel holding position. These legs can also be formed of existing conduit. A full width bottom slot is provided in the body portion which is combined with a cinching bolt at a lower portion of the body portion in the area of the slot. The cinching bolt when tightened being arranged to move the sides of the slot toward each other to bind the legs in their sockets. When the cinching bolt is released, the legs can be released from the body portion for disassembly of the holder.

U.S. Pat. No. 6,076,780

Inventor: Von Honnecke, et al.

Issued: Jun. 20, 2000

A support stand for pipe, conduit, cable or the like which must be held above the surface of a roof. The stand is essentially triangular with the base of the stand forming one side and two legs, joined at their upper ends, forming the other two sides. A strap is fixed at one end to the face of one of the legs and extends upward, over the top of the stand and down the other side. There, it passes around the pipe, etc., to be supported, which rests against the face of the second leg, and then back over the top of the stand and downward past the first end. The free end passes through a tab bridge formed in, or attached to, the first leg. The height at which the pipe is supported is adjusted by altering the length of the free end which passes through the tab bridge. When the height is correct, the strap is folded back over the tab bridge to lock it in position. Preferably, the entire stand, including the strap, is made from sheet metal and the legs are of unequal length. Also preferably, the two legs are formed as a single piece which is shipped flat, and bent to form the two legs and attached to the base at the job site, using tabs inserted into tab bridges or slots, providing a knock down stand which can be assembled without tools.

U.S. Pat. No. 6,299,100

Inventor: Ken Cloud

Issued: Oct. 9, 2001

A cable reel lifter/transporter apparatus for elevating a heavy cable reel above a surface to permit free rotation of the reel, thereby allowing cable or tubing to be payed off the reel, and for manually transporting cable reels includes a pair of L-shaped planar frames each having a long straight handlebar arm and a relatively short straight leg which depends perpendicularly downwards from a lower surface of the handlebar, near a front transverse end thereof, each leg having at the lower end thereof a short tubular foot. A tubular bearing support protruding upwards from each handlebar rotatably supports opposite ends of a horizontal cable reel support shaft. A pair of arbors slidable on the shaft have inner tapered portions insertable into a separate spindle hole in each of two disk-shaped end plates of a cable reel, and subsequently secured to the shaft to hold the shaft and cable reel in a fixed position between the frames. Hand pressure exerted downwardly on the rear ends of the handlebars pivots the legs around the tubular axes of the feet, causing the cable reel support shaft and cable reel to elevate the reel end plates to a freely rotatable position above the ground. Rotating the handlebars on the cable reel support shaft in an opposite direction elevates the legs and feet above the ground, allowing the rear ends of the handlebars to be grasped to push the reel rollably along a surface, the cable reel end plates serving as wheels.

United Kingdom Patent Number GB 827,826

Inventor: Standard Telefon Og Kabel-Fabric

Issued: Feb. 10, 1960

A pay-off and take-up stand for cable drums or reels comprising a lifting frame having bearings for the shaft carrying the cable drum or reel and pivotally mounted on a base frame at a point remote from said bearings, hydraulic lifting means acting along a substantially vertical path between the base frame and a point on the lifting frame close to the said bearing for raising the said drum clear of the base frame.

United Kingdom Patent Number GB 966,726

Inventor: Lionel Osborne Clarke

Issued: Aug. 12, 1964

A portable flexible winding reel and stand with an outer reel so attached to the main reel that it holds the main reel together, the flexibility of the main reel being achieved by means of spring straps forming the sides of the reel, the flexibility of the stand lying in the arrangement of the support rising from the base to the reel.

While these support devices may be suitable for the purposes for which they were designed, they would not be as suitable for the purposes of the present invention, as hereinafter described.

SUMMARY OF THE PRESENT INVENTION

The present invention discloses a pair of collapsible supports having a collar positioned on the upper end of one support and forming an integral part therewith. The device is designed to be used in pairs with a user supplied rod. Each stand is slidably inserted onto the distal ends of the rod by means of a collar and the legs are then pivotally extended to their open position thereby providing means for supporting a spool of material rotatively mounted on the rod.

A primary object of the present invention is to provide a support for a reel or spool that is easily transportable and unfolds in a manner capable of clamping or grasping an extending cylindrical member's ends typically an axle or rod and maintaining said rod or axle so that the reel or spool is in a freely rotatable elevated position.

Another object of the present invention is to provide a support for a reel or spool having a clamping and unfolding position, maintained and accomplished by usage of gravitational forces to create and influence obstructed torsional forces upon the rod or axle created by the load and foundation.

Yet another object of the present invention is to provide a support for a reel or spool having a holding element with a throughbore that creates a receiving aperture used for the insertion of a distal end of a rod or axle there through for later securement therein.

Still yet another object of the present invention is to provide a support for a reel or spool having a pivoting support element that folds about and relative to a primary support element.

Another object of the present invention is to provide a support for a reel or spool having a fastener providing a pivotal connection whereby the point of connection is above the bottom open area of the receiving aperture Still yet another object of the present invention is to provide a support for a reel or spool capable of fitting in one's pocket while in the folded orientation.

Additional objects of the present invention will appear as the description proceeds.

The present invention overcomes the shortcomings of the prior art by providing a support structure for the suspending and free rotation of a held spool or reel having a pivoting support element pivotally connected to a primary support element having a holding element with a throughbore that creates a receiving aperture that allows for the insertion of an engaging rod or axle therethrough so that upon rotation of the pivotable support element about its axis a clamping action is made upon the held spindle or axle when placed upon a foundation with said configuration being maintained by gravitational and torsional forces created by the held load and interaction of the support elements upon a foundation. Additionally, the present invention may be folded to fit into one's pocket and may be available in different sizes to accommodate different sized spools or reels. The foregoing and other objects and advantages will appear from the description to follow. In the description reference is made to the accompanying drawings, which forms a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

LIST OF REFERENCE NUMERALS

Figure 1:
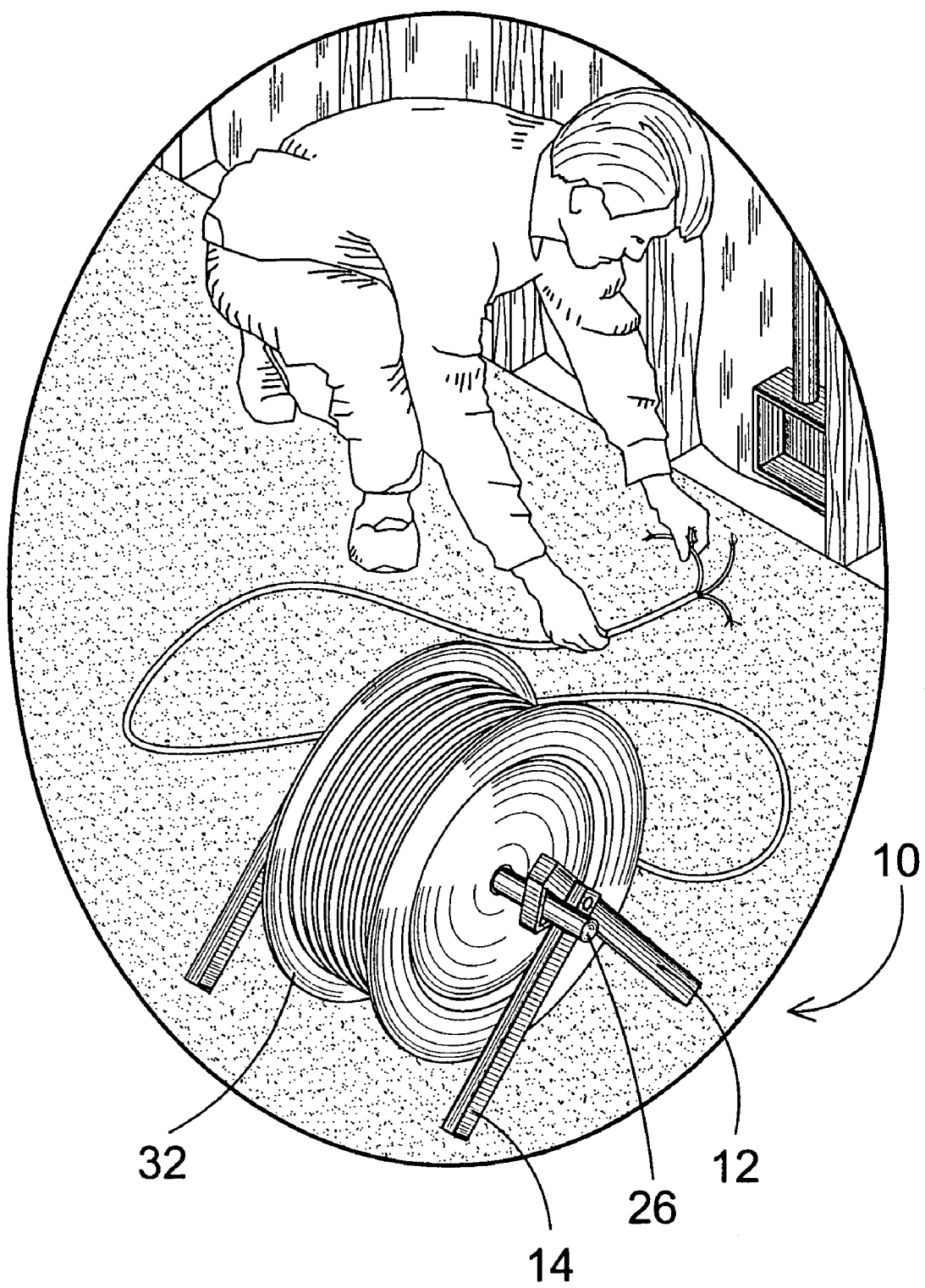
FIG. 1 is an illustrative view of the present invention in use.

With regard to reference numerals used, the following numbering is used throughout the drawings.

10 present invention
12 primary support member
14 pivoting support member
16 receiving aperture
18 collar
20 pivot member
22 retaining post
24 retaining flange
26 spindle
28 ground
30 support bracket
32 spool

DETAILED DESCRIPTION OF THE PREFERRED EMBODIMENT

The following discussion describes in detail one embodiment of the invention (and variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. Shown is the axle support system of the present invention 10 in use to support a spool-bearing spindle 26. The present invention 10 comprises the use of at least two axle support assemblies 12, 14 to suspend the spindle 26 (or axle) by supporting each end thereof on opposing sides of the spool 32.

Figure 2:
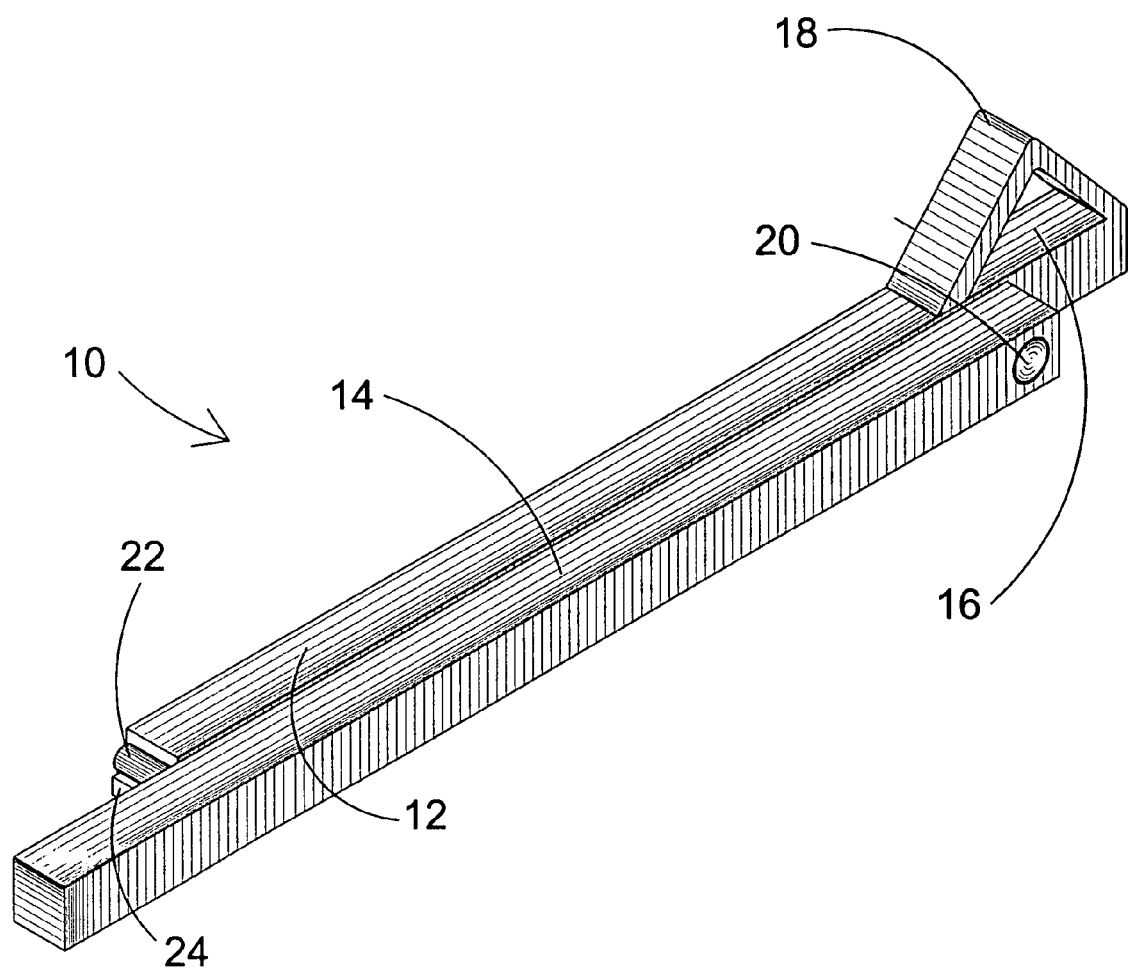
FIG. 2 is a perspective view of the present invention.

Turning to FIG. 2, shown therein is a perspective view of the present invention 10. Shown is the axle support assembly of the present invention 10 having a pair of support members 12, 14 including a primary support member 12 and a pivoting support member 14 pivotally connected to one another towards the top ends thereof with the primary support element having a collar or holding element 18 with receiving aperture 16 disposed above the fastener or pivot point 20. Also shown is an optional means for restricting the rotation of one support member with regard to the other by using a retaining post 22 and flange 24.

Figure 3:
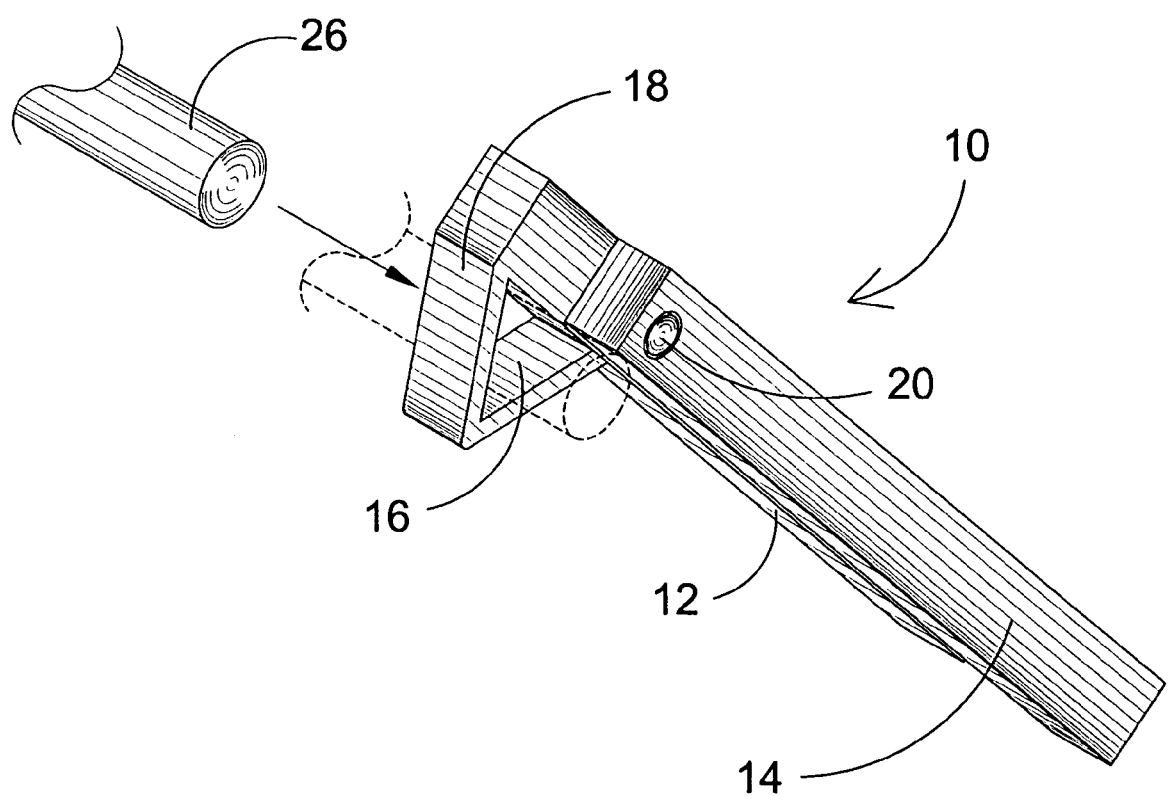
FIG. 3 is a perspective view of the present invention in use.

Turning to FIG. 3, shown therein is a perspective view of the present invention 10 in use. Shown is the present invention 10 in its first step of usage whereby the user selects a distal end of a the cylindrical core, spindle or axle 26 of choice and inserts it through the receiving aperture 16 provided by the holding element or collar 18 integral with the support element, whereby it may later be clamped and held by the present invention. Also shown are the fastener or pivot member 20, primary support 12 and pivoting support 14.

Figure 4:
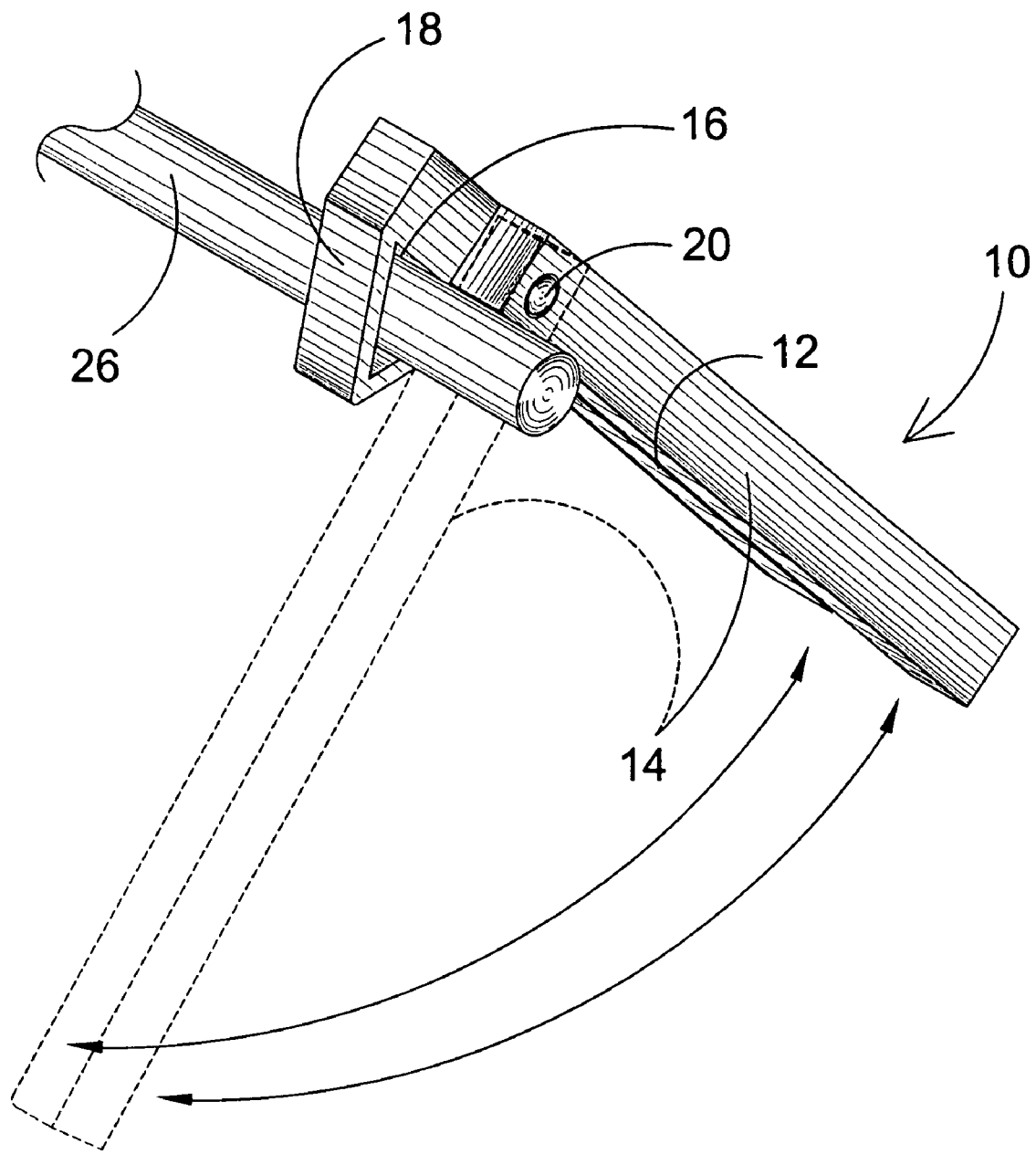
FIG. 4 is a perspective view of the present invention during the opening operation.

Turning to FIG. 4, shown therein is a perspective view of the present invention 10 during the opening operation. Shown is the present invention 10 in transition to the open position whereby when the spindle 26 is inserted through the receiving aperture 16 of collar 18, the spindle acts as a stop or blockage along with the assistance of the holding element 18 effectively causing the held spindle 26 to be clamped therebetween whereby this stopping effect causes the support elements 12, 14 to articulate into an "A" frame construction or stand. Fastener or pivot 20 is also shown.

Figure 5:
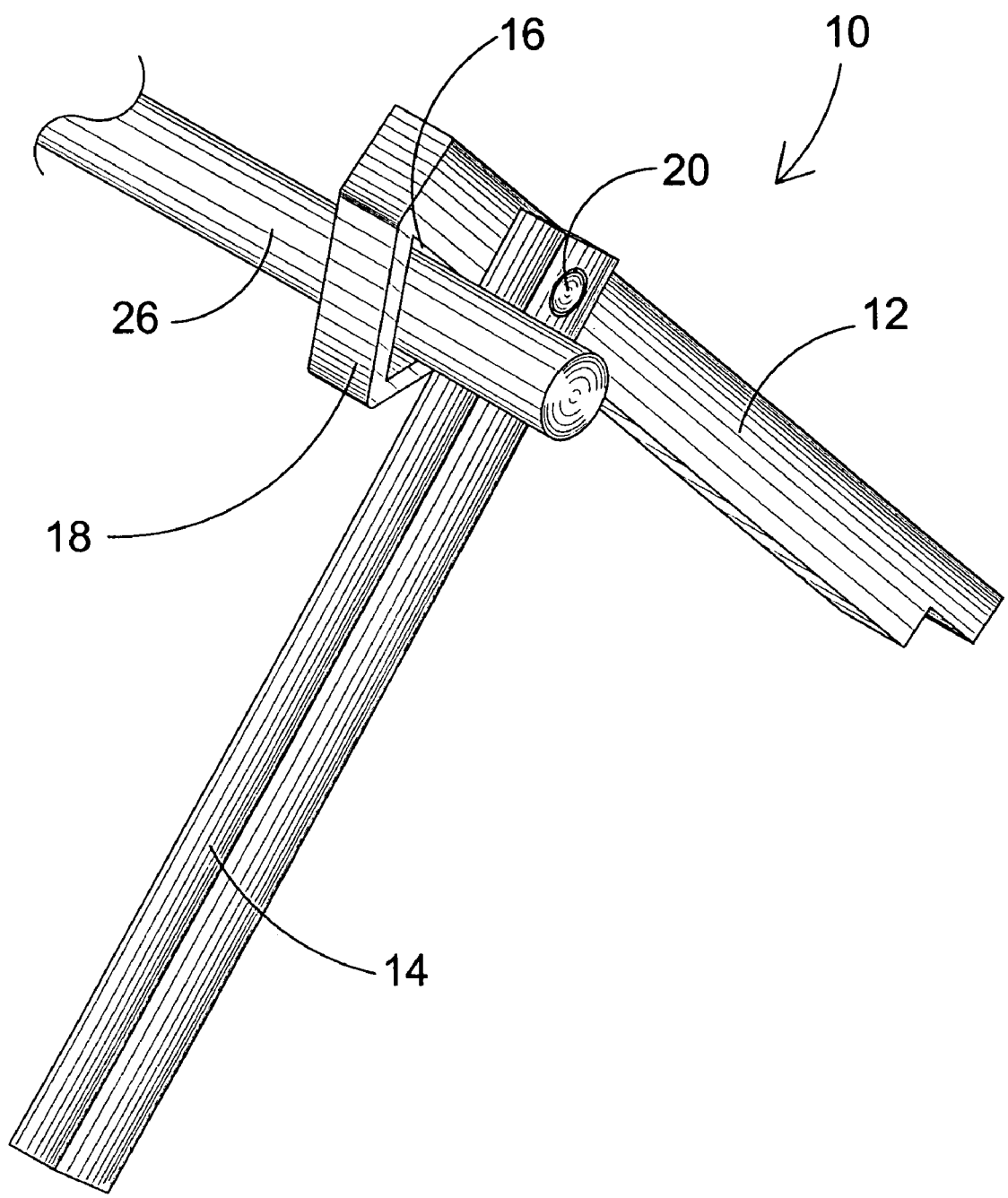
FIG. 5 is a perspective view of the present invention in the open position.

Turning to FIG. 5, shown therein is a perspective view of the present invention 10 in the open position. Shown is the present invention 10 in the open position whereby the spindle 26 is clamped between the holding element's 18 interior surfaces and the pivoting support element's 14 surfaces forming an "A" frame structure that when used in plurality or with the other support 12 can be used to elevate off the ground the spindle of a reel or spool of material so that the material may be easily unwound and held in location without assistance. Other previously disclosed elements are also shown.

Figure 6:
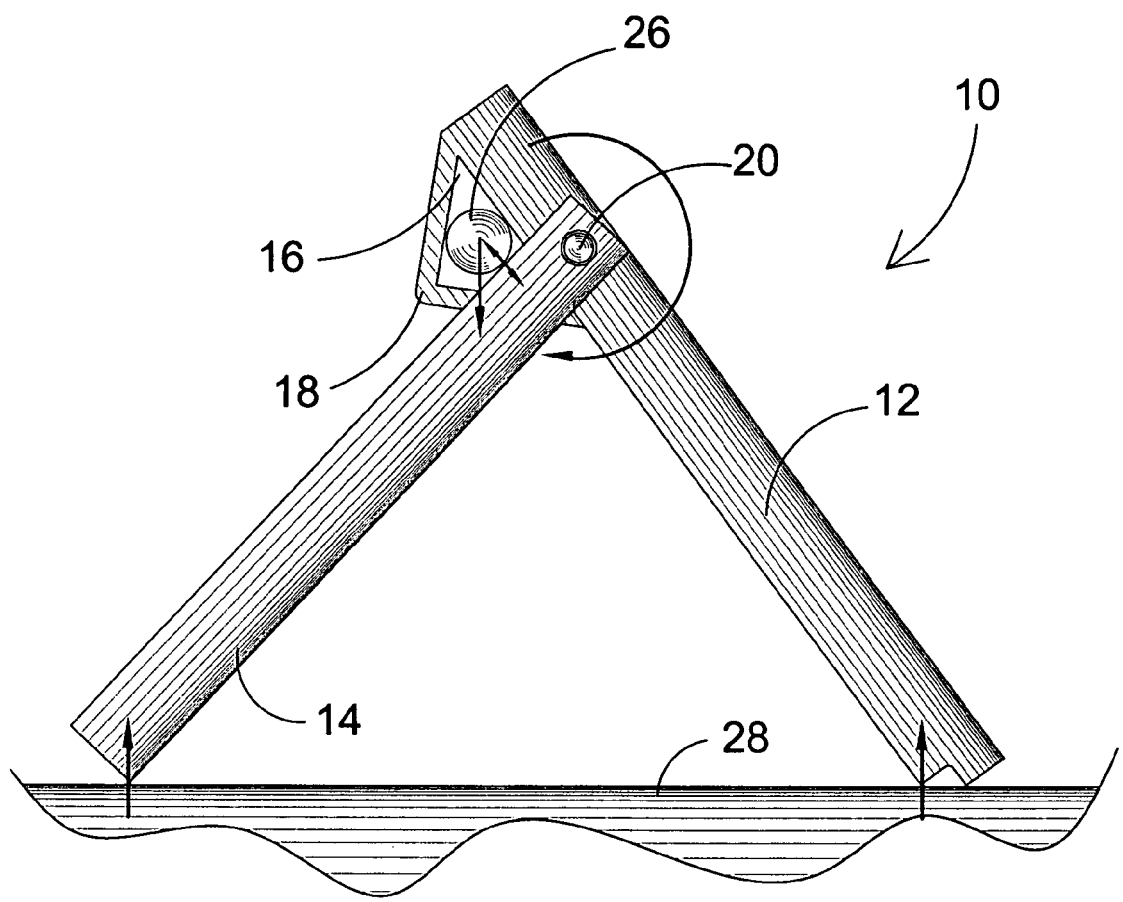
FIG. 6 is a side view illustration of the influencing forces upon the present invention in the open position.

Turning to FIG. 6, shown therein is a side view illustration of the influencing forces upon the present invention 10 in the open position. Shown are the various gravitational and torsional forces influencing the present invention 10 while in the open position. The spindle's 26 weight (gravity) applies downward force upon the support elements 12, 14 and holding element 18 causing the support elements to apply force to the ground 28 whereby the ground will push back (normal force) causing a torsional spin to the support elements due to the "A" frame configuration and pivotal articulation (torque), where the torsional force is halted by the spindle, to effectively form a gravity based clamping action and stable structural configuration. Other elements previously disclosed are also shown.

Figure 7:
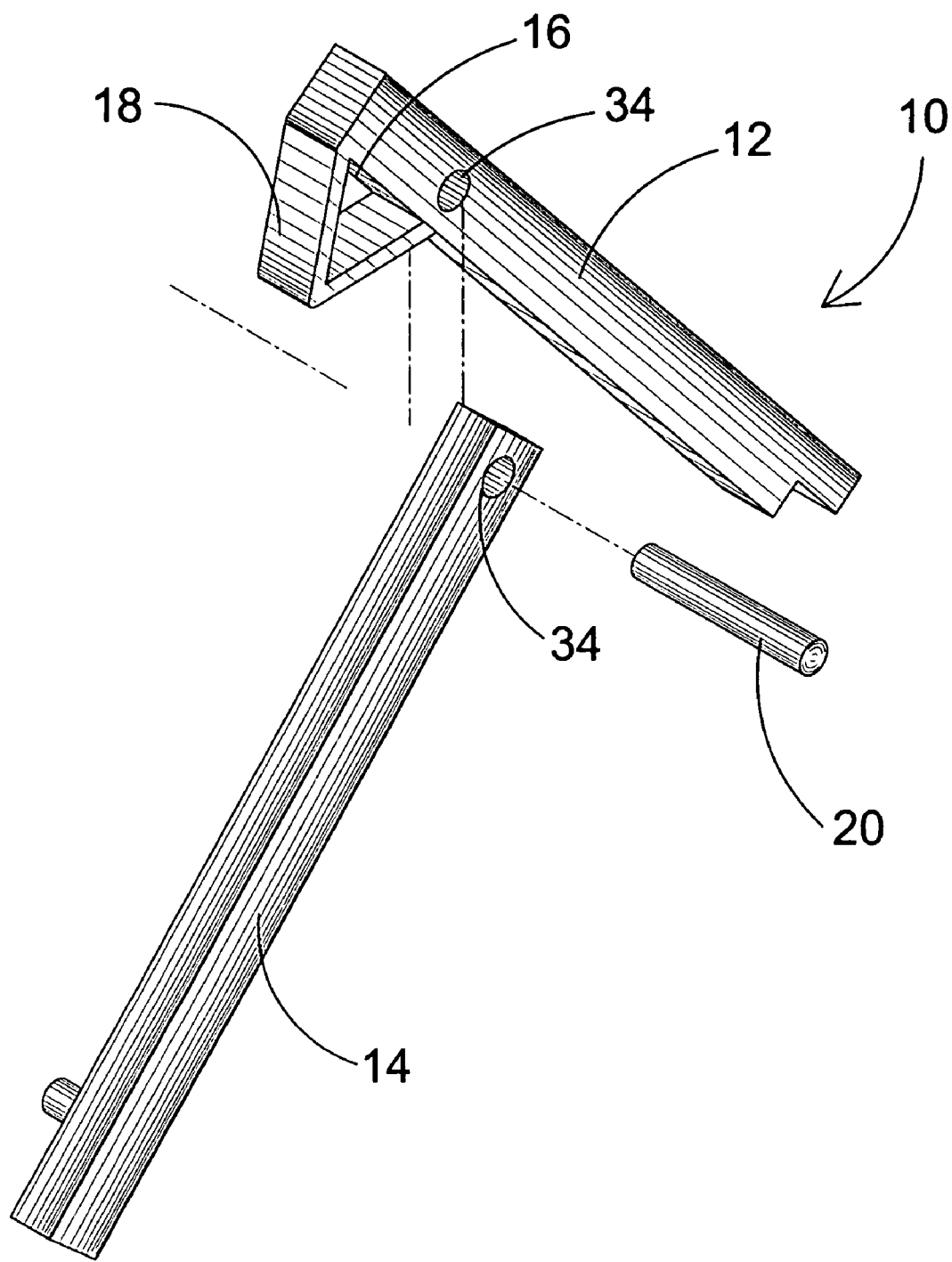
FIG. 7 is an exploded view of the present invention.

Turning to FIG. 7, shown therein is an exploded view of the present invention 10. Shown is the present invention 10 broken down into its basic elements depicting the simple and easy to manufacture structure of the device whereby there are only a small plurality of defined individual structural components. The elements previously disclosed are shown along with co-aligned mating apertures 34 for receiving pivot member 20.

Figure 8:
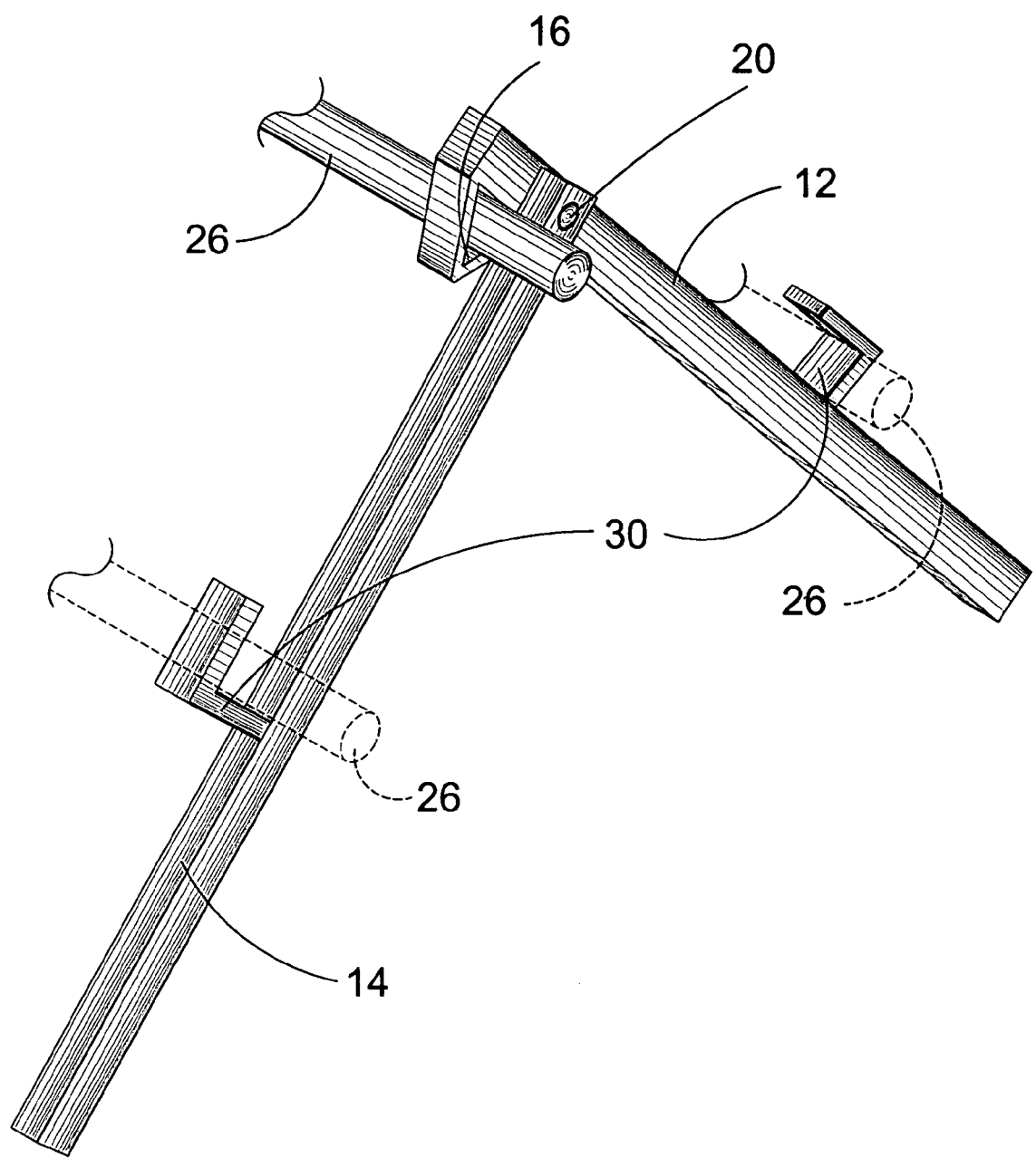
FIG. 8 is a perspective view of an additional element of the present invention.

Turning to FIG. 8, shown therein is a perspective view of an additional element of the present invention 10. Shown is the present invention 10 having the additional support brackets 30 adapted to the exterior surfaces of the support elements 12, 14 to allow for the user to suspend additional spools from the present invention while in the open deployed position. Other elements previously disclosed are also shown.

Figure 9:
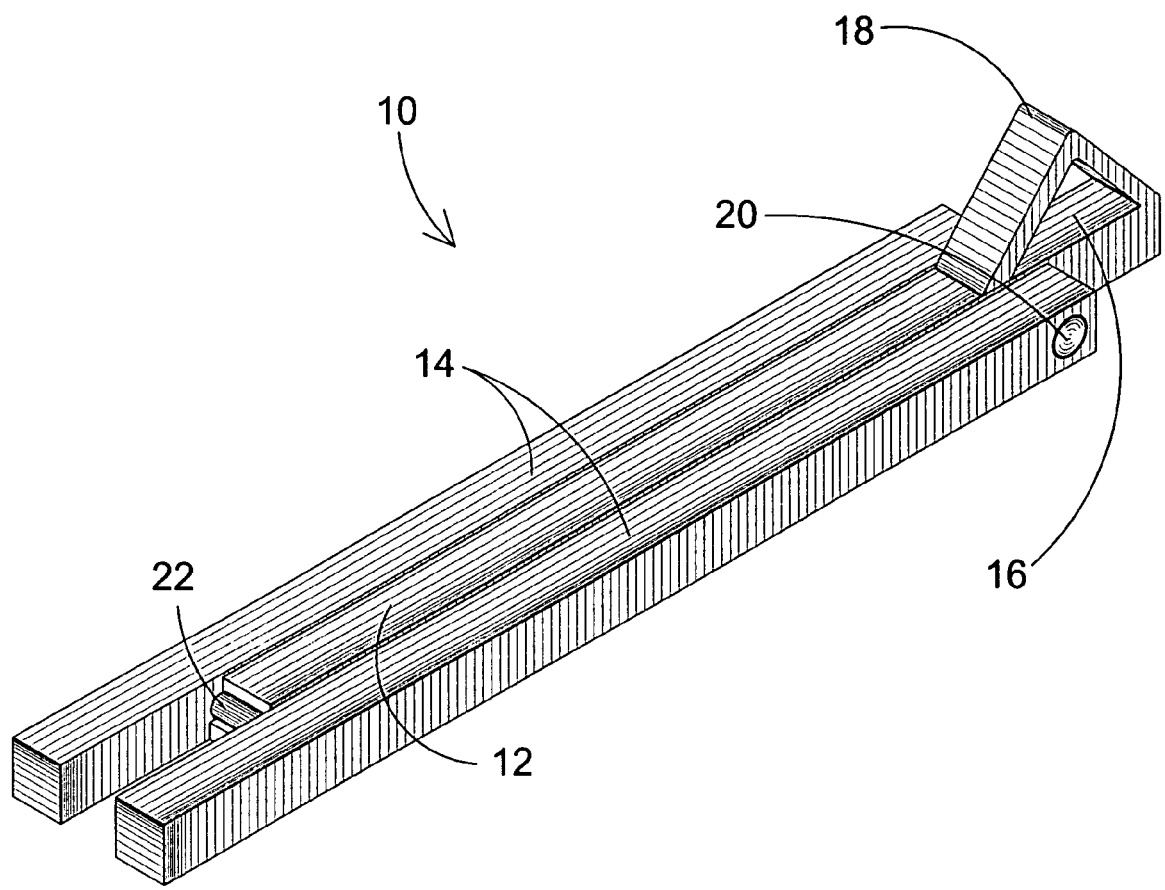
FIG. 9 is an illustrative view of an additional element of the present invention.

Turning to FIG. 9, shown therein is an illustrative view of an additional element of the present invention 10. Shown is the present invention 10 having a pair of pivotal support members 14 disposed on opposing sides of the primary support member 12 and secured to one another by the retaining post 22 running therein between. Other elements previously disclosed are also shown.

I claim:

1. A stand in combination with a spindle having a spool of material rotatably mounted thereon comprising:
 a) a pair of spaced primary support members each having first and second opposing ends, first and second opposing sides and first and second opposing faces;
 b) a collar being disposed on said first face of said first end of each of said primary support members, each said collar having an aperture therein wherein a centerline of said aperture is perpendicular to the axis of an associated primary support member, each said aperture sized to receive an end of the spindle therein, each said collar having first and second opposing peripheral sides, wherein each said first peripheral side is disposed substantially even with said first end of the associated primary support member;
 c) each of a pair of pivoting support members having first and second opposing ends, first and second opposing sides and first and second opposing faces being pivotally disposed contiguous to an associated primary support member so that said first side of each said primary support member is contiguous with said first side of the associated pivoting support member; and,
 d) wherein said first end of each said pivoting support member pivots about a pivot point, wherein said pivot point is positioned adjacent said second peripheral side of said collar on the associated primary support member so that when said second end of said pivoting support member pivots away from said second end of the associated primary support member toward said collar, said first face of said pivoting support member contacts an end of the spindle disposed in said collar, said primary and pivoting support members being spaced apart with said spindle passing through said collars and supported adjacent ends thereof by said pivoting support member.

2. The stand of claim 1, wherein each said pivot point is formed by a pivot member disposed on each of said first sides of each said primary support member and said pivoting support member.

3. The stand of claim 2, wherein each said pivot member is a pin disposed on each of said first sides of said primary support member and said pivoting support member.

4. The stand of claim 3, wherein each of said primary support member and said pivoting support member has an aperture therein, wherein each of said apertures is positioned at said pivot point for receiving the ends of said pin to permit the pivoting support member to pivot on the pin about the primary support member.

5. The stand of claim 4, further comprising a first bracket being disposed on said first face of each said pivoting support member, wherein said bracket is disposed between said pivot point and said second end of said pivoting support member to permit a second spindle to be supported on the first bracket.

6. The stand of claim 5, further comprising a second bracket being disposed on said second face of each said primary support member, wherein said second bracket is disposed between said pivot point and said second end of said primary support member to permit a second spindle to be supported on the second bracket.

7. The stand of claim 4, wherein each of said second ends of each said primary support member and associated pivoting support member are adapted to be secured to each other to permit the stand to be stored in a secured position.

8. The stand of claim 7, further comprising a flange being disposed on said second end of each said primary support member, wherein said flange is disposed in a position to contact a retaining post extending from said first side of the associated pivoting support member to permit each primary support member to be secured to the associated pivoting support member.

9. The stand of claim 8, further comprising:
 a second pivoting support member having first and second opposing ends, first and second opposing sides and first and second opposing faces being pivotally disposed contiguous to and on a side opposite that of said first pivoting support member of each said primary support member.

10. The stand of claim 9, wherein each of said second ends of said primary support member and said first and second pivoting support members are adapted to be secured to each other to permit the stand to be stored in a secured position.

* * * * *